(12) United States Patent
McLaughlin

(10) Patent No.: US 7,347,544 B1
(45) Date of Patent: Mar. 25, 2008

(54) HINGELESS EYEGLASSES AS COLLAR OR HEADBAND

(76) Inventor: Karen Sumire McLaughlin, 1553 Rancho View Dr., Lafayette, CA (US) 94549

( * ) Notice: Subject to any disclaimer, the term of this patent is extended or adjusted under 35 U.S.C. 154(b) by 0 days.

(21) Appl. No.: 11/516,106

(22) Filed: Sep. 5, 2006

(51) Int. Cl.
*G02C 5/00* (2006.01)

(52) U.S. Cl. .................. 351/41; 351/111; 351/158; 2/452

(58) Field of Classification Search .............. 351/41, 351/44, 51, 52, 111, 158; 2/452
See application file for complete search history.

(56) References Cited

U.S. PATENT DOCUMENTS

| D200,735 S | * | 3/1965 | Mit chell ............ 351/44 |
| 3,526,449 A | * | 9/1970 | Bolle et al. .......... 351/41 |
| 3,774,998 A | * | 11/1973 | Kise ................. 351/51 |
| 5,771,500 A | | 6/1998 | Mayes |
| 5,893,198 A | | 4/1999 | DeCotis |
| 5,898,472 A | | 4/1999 | Oshikawa |
| 5,903,928 A | | 5/1999 | Hyung-Seob |
| 5,956,812 A | | 9/1999 | Moennig |
| 7,070,273 B2 | | 7/2006 | Benavides et al. |

\* cited by examiner

*Primary Examiner*—Huy K Mai

(57) ABSTRACT

Hingeless eyeglasses as collar or headband comprises a pair of reading glass or sunglass lenses framed by a lightweight, horseshoe shaped, single piece of narrow band. The narrow band containing eyeglass lenses is specifically shaped to fit around the neck or on top of the head of a wearer comfortably when the device is not being used. Unlike most wearers of bi-focal or prescription lenses, the inconvenience of locating the eyeglasses is common among the wearers of reading glasses or sunglasses. Therefore, to be worn as a collar, a necklace, or a headband and not having to experience the frequent losses of hinge screws are advantages over the prior art. The present device provides a wearer a choice of assorted strengths of optical lenses, as well as various shades and shapes, framed by several sizes, colors, and designs of attractive narrow bands. The present device can be inexpensively manufactured.

8 Claims, 3 Drawing Sheets

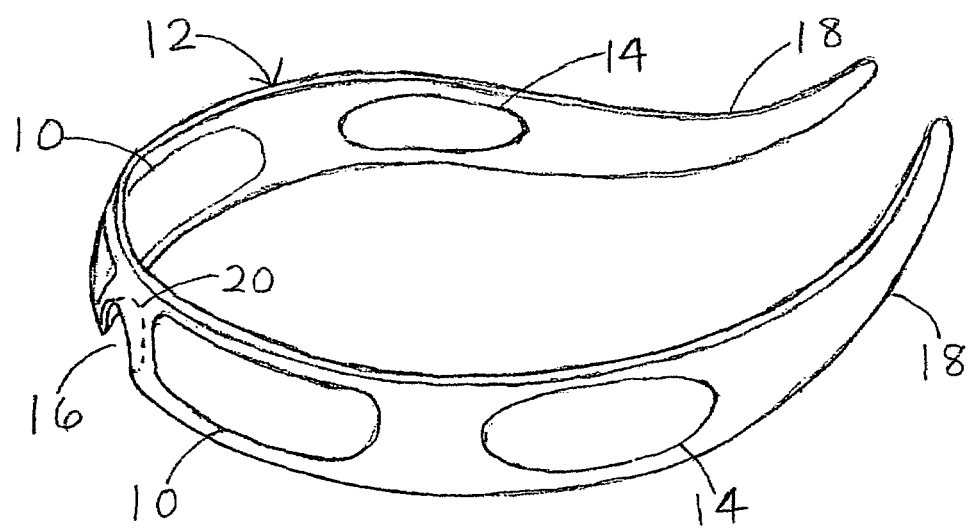
FIG. 1-A
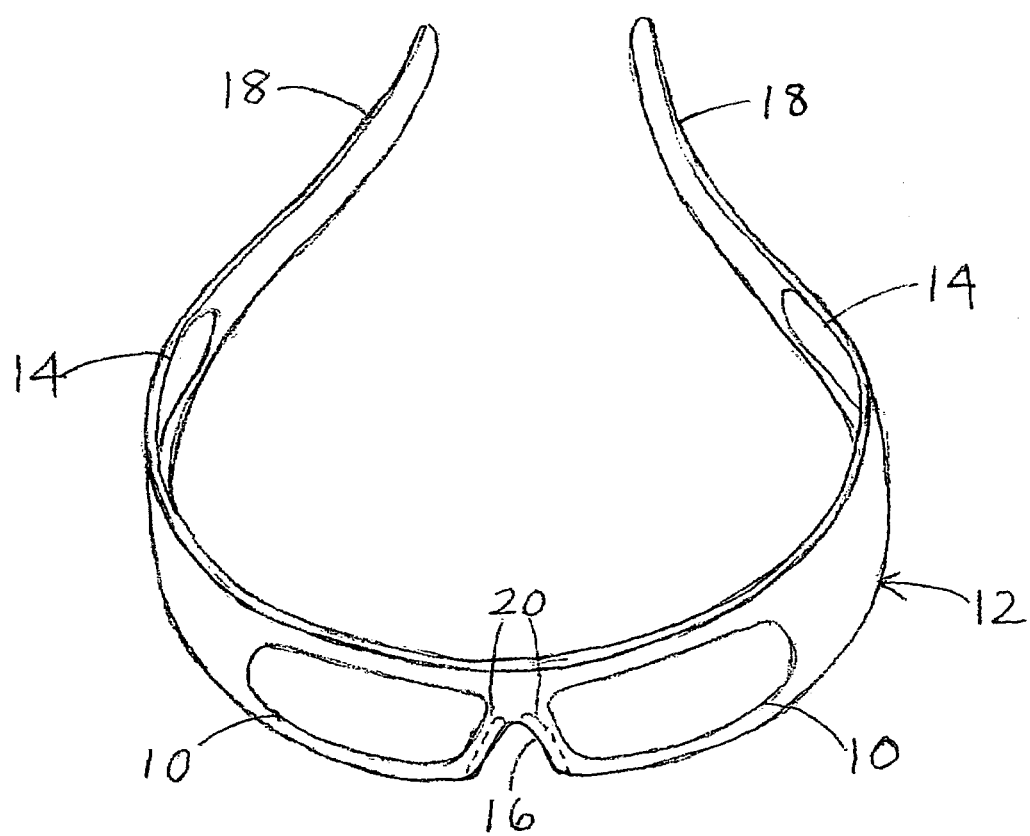
FIG. 1-B

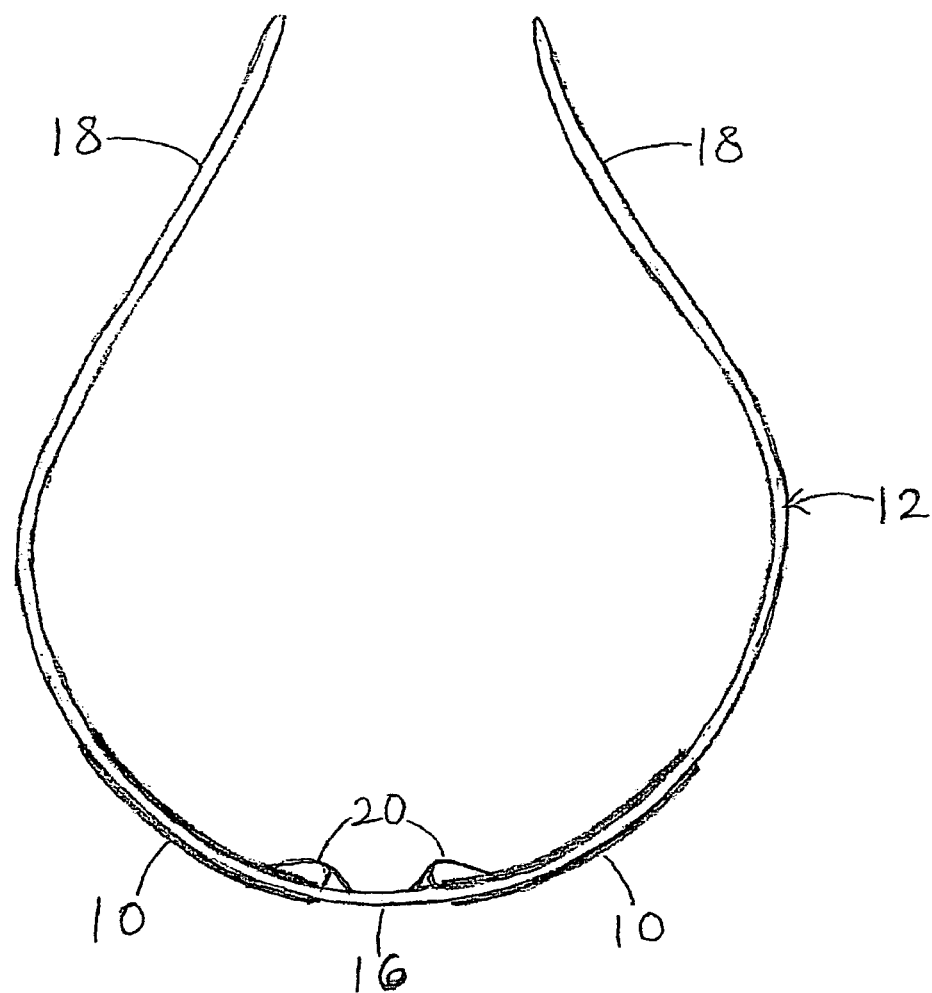
FIG. 2-A
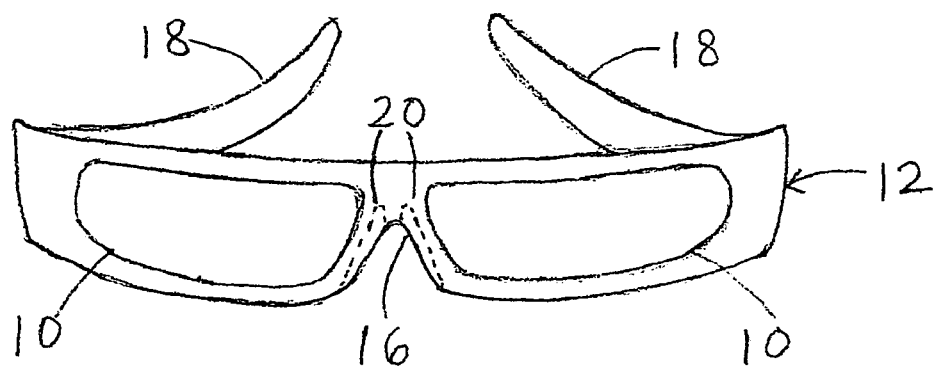
FIG. 2-B

HINGELESS EYEGLASSES AS COLLAR OR HEADBAND

CROSS-REFERENCE TO RELATED APPLICATIONS

Not Applicable

FEDERALLY SPONSORED RESEARCH

Not Applicable SEQUENCE LISTING OR PROGRAM
Not Applicable

BACKGROUND OF THE INVENTION

1. Field of the Invention

This invention relates to eyeglasses, and more specifically pertains to hingeless eyeglasses as a part of a collar as well as a headband.

2. Description of the Related Art

One's eyewear, particularly the appearance of having attractive shapes, colors, and designs combined with the function of wearing reading glasses and sunglasses, has become extremely important, especially as the population of baby-boomers is getting older and needing reading glasses daily. Unlike most eyeglass wearers of bi-focal or prescription lenses, many reading glasses or sunglass wearers do not wear eyeglasses at all times, often resulting in the misplacement or the loss of eyeglasses. While most frames of sunglasses are rigidly constructed and the sunglasses wearers are commonly able to place them on top of the head as a convenient holding place when the sunglasses are not being used at eyelevel, the frames of most reading glasses are too fragile to stay on the head of a wearer. Wearing a long chain or a string, attached to the temple of eyeglasses, around the neck in the prior art often causes a breakage of the frame or scratches on the lenses of eyeglasses with a wearer's physical movement. Furthermore, conventional eyeglasses are hinged with screws which frequently become loose and require an immediate repair. In addition to the functions and the comfort of wearing eyeglasses, the accessibility and the attractiveness of eyewear is essential to all eyeglass wearers. Therefore, based on the systems known in the art for the eyeglasses, there is a need for an improved device.

Known prior art, includes U.S. Pat. No. 5,956,812 (Sep. 28, 1999) to Moenning and U.S. Pat. No. 5,893,198 (Apr. 13, 1999) to DeCotis, describes the devices as attachments to the eyeglasses which generate swaying effects on the eyeglasses and causes damage to the eyeglasses. U.S. Pat. No. 5,898,472 (Apr. 27, 1999) to Oshikawa, describes securing the eyeglasses on the head of a wearer by wearing a particular hat with a retractable cord which is attached to the temple of glasses in a reel at the back of the hat. The eyeglasses are securely held on a wearer's head only by wearing a particularly designed hat and no others. Also, U.S. Pat. No. 5,903,928 (May 18, 1999) to Hyung-Seob, describes particularly designed shirts with hooks. Neither devices of U.S. Pat. No. 5,898,472 (Apr. 27, 1999) to Oshikawa nor U.S. Pat. No. 5,903,928 (May 18, 1999) to Hyung-Seob, gives a wearer a choice to wear any other garment for the secure holding of eyeglasses. U.S. Pat. No. 7,070,273 B2 (Jul. 4, 2006) to Benavides and others, describes protection of the lenses while eyeglasses are not being used by turning around the eyeglass temple to the face of eyeglasses with uniquely designed hinges. While the lenses are protected, the matters associated with a loss of unique hinge screws and the convenient use of the device still exist. U.S. Pat. No. 5,771,500 (Jun. 30, 1998) to Mayes, describes securing the lenses or eyeglasses by inserting lenses in the retainer pockets of a headband with a fastener at the back, or fitting the temple of eyeglasses through a tunnel on each temple of the headband with conventional eyeglasses. Whereas the device is securely stays on a wearer's head, the tightly fit headband made by multiple layers of material creates excess heat on the wearer's head while engaging in physical activity.

SUMMARY OF THE INVENTION

The present invention comprises a pair of reading glass or sunglass lenses framed by a lightweight, horseshoe shaped, single piece of narrow band. The narrow band containing eyeglass lenses is specifically shaped to fit around the neck or on top of the head of a wearer comfortably when the device is not being used. Unlike most wearers of bi-focal or prescription lenses, the inconvenience of locating the eyeglasses is common among the wearers of reading glasses or sunglasses. Thus, to be worn as a collar, a necklace, or a headband and not having to experience the frequent losses of hinge screws are advantages over the prior art. The present device provides a wearer a choice of assorted strengths of optical lenses, as well as various shades and shapes, framed by several sizes, colors, and designs of attractive, aerodynamic narrow bands for male or female at any age. Therefore, the present invention responds to various deficiencies in the prior art and achieves the desirable affect on one's appearance in addition to the functions of eyeglasses. The present device can be inexpensively manufactured without the need for the hinges or the separate pieces of the eyeglass temple.

For a more complete understanding of the above, other features, and advantages of the invention, reference should be made to the following brief and detailed description of preferred embodiments thereof and to the accompanying drawings.

BRIEF DESCRIPTION OF THE DRAWINGS

FIG. 1-A illustrates one embodiment of a view of a hingeless eyeglass device with a side slots design; and FIG. 1-B illustrates one embodiment of another view of a hingeless eyeglass device with a side slots design in accordance with the invention.

FIG. 2-A illustrates one embodiment of a top view of a hingeless eyeglass device; and FIG. 2-B illustrates another embodiment of a front view of a hingeless eyeglass device illustrated in FIGS. 1-A and 1-B.

DETAILED DESCRIPTION OF THE PREFERRED EMBODIMENT

Figure 3:
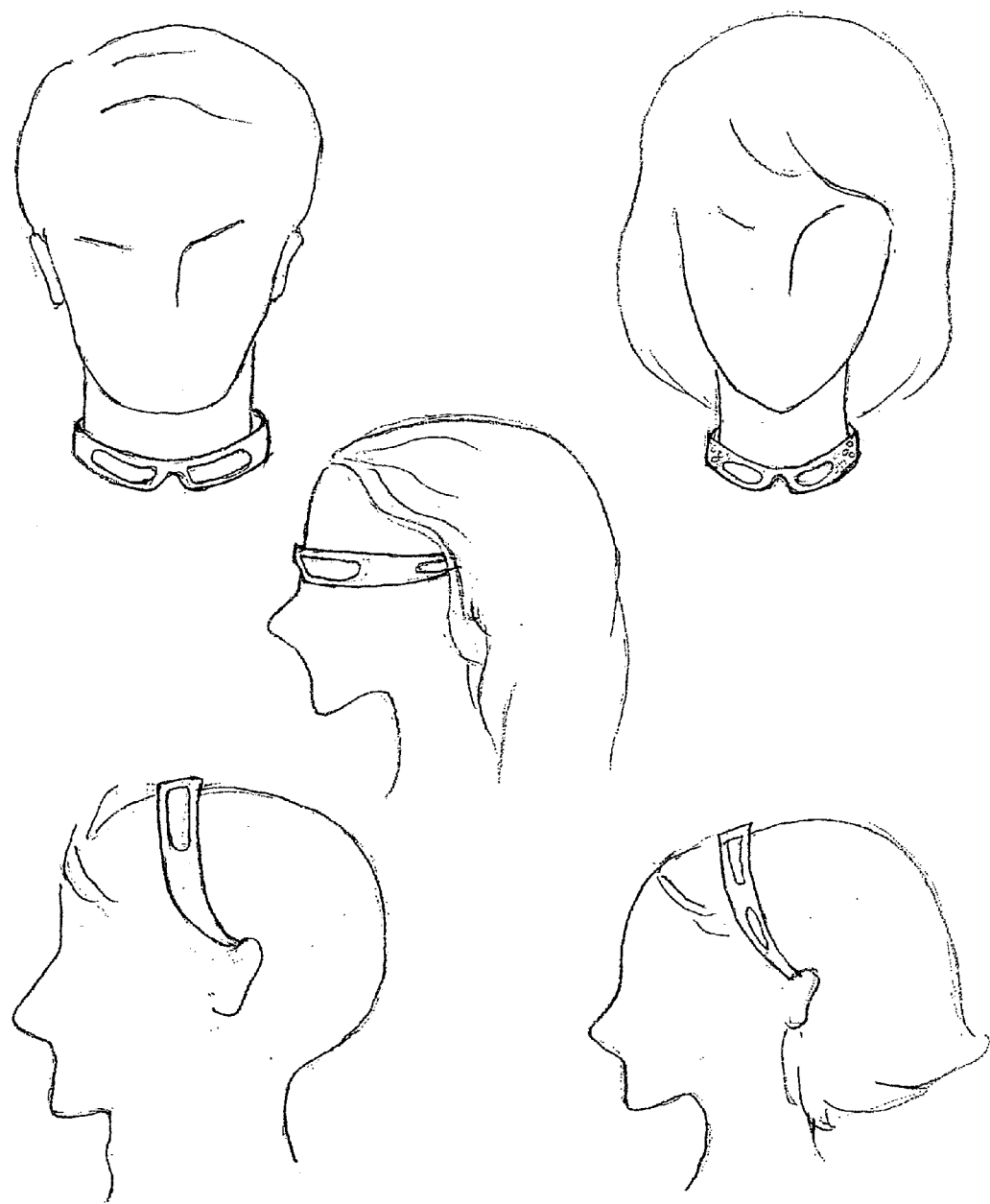
FIG. 3 illustrates various achievable wearing positions on male and female with a hingeless eyeglass device of the present invention.

Referring now to the drawings, and more particularly to FIG. 1-A through 3.

FIG. 1-A shows a view of a hingeless eyeglass device with a pair of lenses 10, framed by a narrow band 12, with an inverted V-shaped opening 16, preferably a narrower upward curved tips 18, and a side slots design 14.

FIG. 1-B shows another view of a hingeless eyeglass device with a pair of lenses 10, framed by a narrow band 12, with an inverted V-shaped opening 16, preferably a narrower upward curved tips 18, and a side slots design 14.

FIG. 2-A shows a top view of a hingeless eyeglass device with a pair of lenses 10, framed by a narrow band 12, indicating the location of a pair of lenses 10, bridge-rest protrusions on inner surface 20, an inverted V-shaped opening located at the center of bottom portion 16, of the narrow band 12, and preferably a narrower upward curved tips 18.

FIG. 2-B shows the front view of a hingeless eyeglass device with a pair of lenses 10, framed by a narrow band 12, indicating the location of a pair of lenses 10, bridge-rest protrusions on inner surface 20, an inverted V-shaped opening located at the center of bottom portion 16, of the narrow band 12, and preferably a narrower upward curved tips 18.

FIG. 3 shows various achievable wearing positions on male and female with hingeless eyeglasses of the present device.

It is to be understood that the specific embodiments of the present invention have been shown and described, and it will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

I claim:

1. A pair of eyeglasses comprising a frame and lens pair supported by said frame, the frame comprising a U-shaped band having a centrally-located bridge located proximate to and between each lens of said lens pair and having two distal ends, each distal end being characterized as being narrower than the frame portion proximate said lens pair and being upturned when said eyeglasses are being worn by a user.

2. The pair of eyeglasses of claim 1 wherein said frame is of a single construction devoid of hinges.

3. The pair of eyeglasses of claim 1 wherein said bridge comprises an inverted V-shaped notch configured within said frame.

4. The pair of eyeglasses of claim 1 wherein said lenses are sunglass lenses.

5. The pair of eyeglasses of claim 1 wherein said lenses are reading glass lenses.

6. The pair of eyeglasses of claim 1 wherein a plurality of portions of the frame are removed there from to reduce the weight of said frame.

7. The pair of eyeglasses of claim 1 wherein the frame comprises a member selected from the group consisting of metal and plastic.

8. The pair of eyeglasses of claim 1 wherein the distal ends of said frame are situated closer to one another when said eyeglasses are not worn than when said eyeglasses are worn by a user.

* * * * *

UNITED STATES PATENT AND TRADEMARK OFFICE
CERTIFICATE OF CORRECTION

PATENT NO. : 7,347,544 B1 Page 1 of 1
APPLICATION NO. : 11/516106
DATED : March 25, 2008
INVENTOR(S) : Karen McLaughlin It is certified that error appears in the above-identified patent and that said Letters Patent is hereby corrected as shown below:

Title Page item 76 should read-

2 Janet Way, #101
Tiburon, CA 94920

Signed and Sealed this

Seventeenth Day of June, 2008

JON W. DUDAS
*Director of the United States Patent and Trademark Office*